United States Patent Office 3,529,439
Patented Sept. 22, 1970

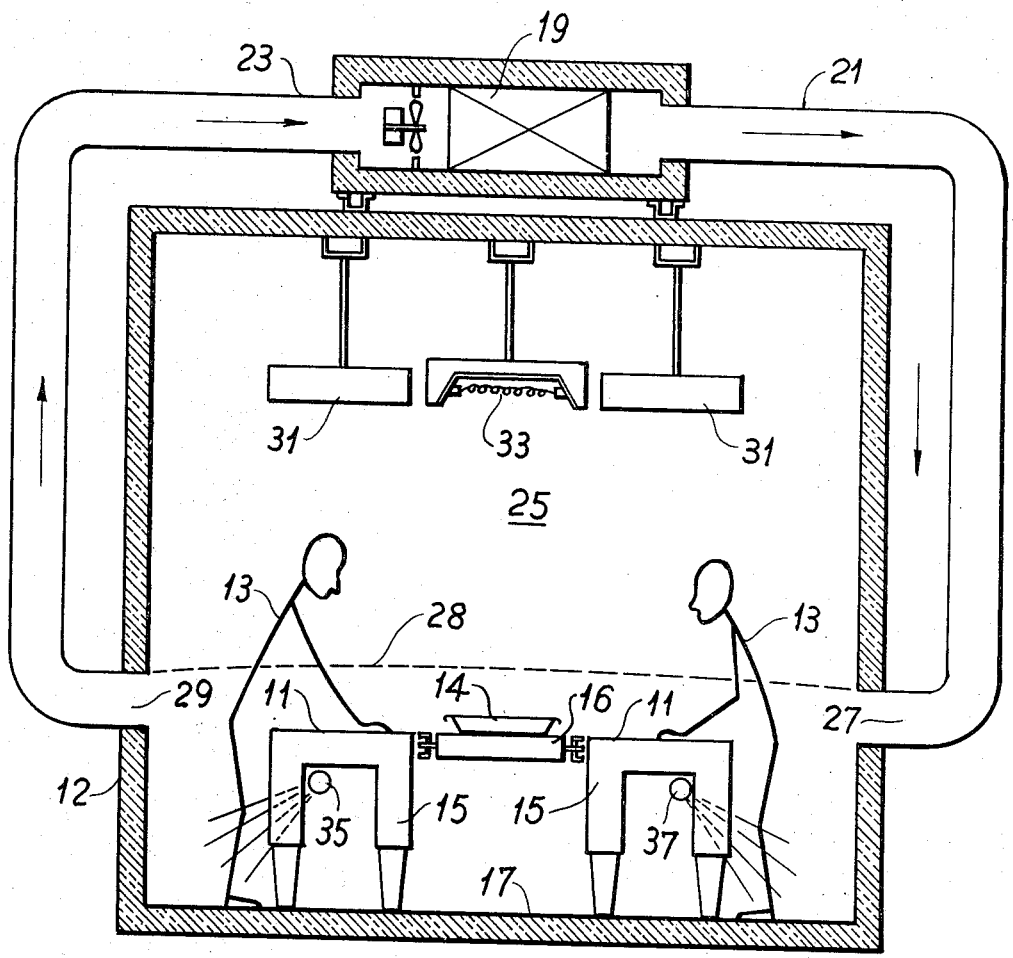

3,529,439
REFRIGERATED CUTTING ROOM
James H. Brennan, Trenton, N.J., assignor to Emhart Corporation, Bloomfield, Conn., a corporation of Connecticut
Continuation-in-part of application Ser. No. 777,955, Oct. 15, 1968. This application May 20, 1969, Ser. No. 826,097
Int. Cl. F25d *17/06*
U.S. Cl. 62—419         6 Claims

ABSTRACT OF THE DISCLOSURE

A room or space wherein meat products and the like are cut, wrapped, weighed or otherwise prepared for retail sales is provided with refrigerating means and ducts or passages through which refrigerated air is passed to the room or space in a manner to maintain a stratified layer of refrigerated air at a level to keep the products being prepared at a desired low temperature whereas the upper portion of the room or space is maintained at a temperature which is high enough to be more comfortable to personnel working in the room.

RELATED APPLICATION

This application is a continuation-in-part of applicant's copending application Ser. No. 777,955 filed Oct. 15, 1968.

FIELD OF INVENTION

In the preparation of cut meat products for retail sale, it is usual to move a side of beef or other carcass from a storage chamber where it is maintained at a desired low temperature to a cutting room where the carcass is cut into suitable portions for retail sale to individual customers. These cut portions are generally trimmed, wrapped, weighed and priced in the cutting room by butchers, girls and other personnel, after which they are placed on trays or the like for transfer to refrigerated display equipment for retail sale.

In order for such personnel to work effectively in the cutting room, it is usual to maintain the air in the cutting room at a temperature of 50° to 70° F. However, when cut meats are allowed to attain temperatures above about 31° to 35° F., they tend to "bleed" or to lose their juices so as to become unattractive in appearance. Moreover, the rate of growth of air borne bacteria on meat products at temperatures above about 35° F. is vastly increased.

In accordance with the present invention, means are provided for stratifying the air within a cutting room so as to maintain the meats or products being prepared for sale at a constant low temperature whereas the upper portion of the cutting room and the air about the head and upper portion of the body of persons working in the cutting room is maintained at a substantially higher temperature. Further, if desired, radiant heating elements may be positioned and focused so as to warm the legs and feet of such persons without appreciably raising the temperature of the air which comes in contact with the products being cut, wrapped, weighed or otherwise prepared for display and sale.

THE DRAWING

The drawing is a diagrammatic vertical section view of a typical cutting room embodying the present invention.

PREFERRED EMBODIMENT OF THE INVENTION

In that form of the invention chosen for purposes of illustration in the drawing, the meats or other articles are continuously maintained at the desired and uniform temperature of about 31° F. during the operations of cutting, weighing, wrapping or otherwise preparing the same while avoiding the discomfort and health hazards heretofore encountered by personnel working in rooms maintained at such low temperatures. For this purpose, the sides of beef, pork or other carcasses or bulk meat products, when removed from the cold room are transferred to a cutting room 12 such as that shown in the drawing. This cutting room is provided with tables 15 or the like having working surfaces 11 which are positioned at a convenient level to permit operation thereon by meat cutters or other personnel 13 who cut, trim, weigh, wrap or otherwise prepare the meat for retail sale. The products thus prepared may then be placed on trays 14 movable on a conveyor 16 to the refrigerated display equipment or elsewhere. The height of the upper surface 11 of the table 15 and conveyor 16 on which the meat is supported during work thereon may be anywhere from, say about 30 to 40 inches above the floor 17 on which the operators stand.

In order that the temperature of the air surrounding the meat during work thereon will always be maintained at about 31° F., a refrigerating unit 19 is provided with an air discharge duct 21 and an air return duct 23 through which refrigerated air is circulated to and from the space 25 within the cutting room 12. The inlet 27 of the air discharge duct 21 communicates with the space 25 in the cutting room 12 at a level approximately equal to that of the working surface 11 of the table 15 and conveyor 16, that is about 30 to 40 inches above the floor 17. The outlet 29 for the passage of air to return duct 23 is located at about this same level. As a result, it is possible to establish a pool or body of refrigerated air below a line as indicated at 28 whereby the lower portion of the cutting room 12 in which the meat is located is maintained at the desired low and constant temperature of about 31° F. It is desirable to form the air inlet 27 and outlet 29 of relatively large area, so that the refrigerated air in the lower portion of the cutting room 12 will slowly flow across the room at a low velocity so as to permit effective stratification thereof and avoid drying out of the meats during work thereon.

The upper portion of the cutting room 12, above the line 28 and above the stratified refrigerated air may be maintained at a higher temperature, say 50° to 55° F. For this purpose, lights 31 and heating means 33 may be located in the upper portion of the cutting room above the stratified lower refrigerated air in the cutting room. The heads and upper portions of the bodies of the workers then will not be chilled to such an extent as to make them uncomfortable or render them subject to repeated colds, sinus troubles or other health problems which might give rise to hazardous sanitation problems. At the same time, the workers may wear heavy trousers, socks, boots and underwear to protect the lower portions of their bodies which are exposed to the refrigerated air circulated about the meat to maintain it at the desired constant temperature.

This stratification and control of the temperature of the air within the lower and upper portions of the room in which the meat is cut, wrapped or otherwise prepared for retail sale, assures the preservation of the meat at the required temperature needed to maintain it in prime condition whereas the comfort and health of the workers are improved and the frequent loss of time of personnel working in the cutting room by reason of illness is greatly reduced.

In some instances, in order to increase the comfort of personnel, the table on which the meat or other articles are supported may be provided with radiant heating elements as indicated at 35 and 37. These elements are located below the working surface 11 and may be directed or focused outwardly and downwardly from the working surface toward the feet and legs of persons standing by the table. Since such radiant heating means have very little heating effect upon the air within the cutting room, they do not tend to interfere with the stratification of the air within the room.

In the construction described, the air in the cutting room below the level of the refrigerated air inlet 27 and outlet 29, or as represented by the line 28 on the drawing, may be maintained at a temperature of about 31° F. while the air above line 39 may be about 50° F. or as high as 70° F., if desired. The refrigerated air, being heavier, tends to remain in the lower portion of the cutting room below the line 28 as it flows from the inlet 27 to outlet 29. Further, in order to limit turbulence and intermixing of the cold and warm air layers at the interface therebetween, it is preferable to cause the refrigerated air to flow from the inlet to the outlet at a velocity which need not be more than about ½ to 5 feet per second and should not exceed about 10 feet per second.

While the equipment described is referred to as a "cutting room" and is of particular advantage for use in the preparation of cut meats for retail sale, it will be apparent that such constructions may be used in the handling of other articles and products as when packaging or handling frozen foods, dairy products and the like.

I claim:

1. Refrigerated equipment comprising an insulated enclosure, a product support in said enclosure having a working surface thereon, a work space for personnel in said enclosure adjacent said working surface, said working surface being located in the lower portion of said enclosure and spaced from the floor thereof at an elevation which will enable personnel in said work space to work at said surface, an air inlet communicating with the enclosure at a level near the level of said working surface, an air outlet communication with said enclosure at about the same level as said air inlet, means for refrigerating and circulating air slowly through said enclosure from said inlet to said outlet so as to establish a stratified zone of refrigerated air confined within the lower portion of the enclosure and including said working surface, and means for maintaining the air in said enclosure above said stratified zone at a temperature above the air in said zone.

2. Refrigerated equipment as defined in claim 1 wherein said refrigerating means serve to maintain the air in said stratified zone at a temperature of about 30° to 35° F.

3. Refrigerating equipment as defined in claim 1 wherein said circulating means serve to cause air to flow from said inlet to said outlet at a velocity not exceeding about 10 feet per second.

4. Refrigerated equipment as defined in claim 1 wherein radiant heating elements are located below the working surface of said support.

5. Refrigerated equipment as defined in claim 4 wherein said radiant heating elements are located beneath said working surface and are directed outwardly and downwardly therefrom toward said work space.

6. Refrigerated equipment as defined in claim 1 wherein heating means are located in said enclosure above said zone to raise the temperature of the air above said zone.

References Cited

UNITED STATES PATENTS

| | | | |
|---|---|---|---|
| 1,955,669 | 4/1934 | Botz | 62—419 |
| 2,104,879 | 1/1938 | Lindsey | 62—419 |
| 2,474,069 | 6/1949 | Silvera | 62—419 |
| 2,529,388 | 11/1950 | Hammond | 62—419 |
| 2,594,023 | 4/1952 | Hubacker | 165—30 |
| 2,651,503 | 9/1953 | Mills | 165—49 |
| 3,009,331 | 11/1961 | Hewett | 62—271 |

FOREIGN PATENTS 672,643   5/1952   Great Britain.

WILLIAM J. WYE, Primary Examiner

U.S. Cl. X.R.

62—407; 165—30, 49